US007692686B1

(12) United States Patent
Cabot

(10) Patent No.: US 7,692,686 B1
(45) Date of Patent: Apr. 6, 2010

(54) METHOD AND APPARATUS FOR CODING FORMAT AUTODETECTION TESTING

(75) Inventor: Richard C. Cabot, Lake Oswego, OR (US)

(73) Assignee: XFRM Incorporated, Lake Oswego, OR (US)

( * ) Notice: Subject to any disclaimer, the term of this patent is extended or adjusted under 35 U.S.C. 154(b) by 1078 days.

(21) Appl. No.: 11/358,389

(22) Filed: Feb. 21, 2006

(51) Int. Cl.
*H04N 17/00* (2006.01)
*H04R 29/00* (2006.01)
*G06F 19/00* (2006.01)

(52) U.S. Cl. .......................... 348/192; 381/56; 381/58; 702/69

(58) Field of Classification Search ................. 348/180, 348/181, 192; 375/224–228; 702/57, 66, 702/67, 69, 71, 122; 714/724, 738, 742; 381/56, 58; 455/67.11, 67.14, 67.7
See application file for complete search history.

(56) References Cited

U.S. PATENT DOCUMENTS

| | | | | |
|---|---|---|---|---|
| 5,003,554 | A * | 3/1991 | Chism | 375/224 |
| 5,323,396 | A | 6/1994 | Lokhoff | 370/94.1 |
| 5,649,052 | A * | 7/1997 | Kim | 704/226 |
| 5,731,839 | A * | 3/1998 | Panaro | 375/240.15 |
| 5,749,047 | A | 5/1998 | Cabot | 455/67.4 |
| 6,076,062 | A | 6/2000 | Van Steenbrugge | 704/500 |
| 6,138,051 | A | 10/2000 | Dieterich | 700/94 |
| 6,205,223 | B1 | 3/2001 | Rao et al. | 380/42 |
| 6,460,152 | B1 * | 10/2002 | Demidov et al. | 714/723 |
| 6,470,034 | B1 | 10/2002 | Tan | 370/514 |
| 6,502,045 | B1 * | 12/2002 | Biagiotti | 702/66 |
| 6,629,197 | B1 | 9/2003 | Bhogal et al. | 711/111 |
| 6,631,486 | B1 * | 10/2003 | Komatsu et al. | 714/724 |
| 6,898,272 | B2 * | 5/2005 | Talalai | 379/10.03 |
| 6,965,597 | B1 * | 11/2005 | Conway | 370/389 |
| 2001/0033629 | A1 | 10/2001 | Ito | 375/368 |
| 2002/0026309 | A1 * | 2/2002 | Rajan | 704/200.1 |
| 2002/0159632 | A1 * | 10/2002 | Chui et al. | 382/168 |
| 2002/0162066 | A1 * | 10/2002 | Khoche et al. | 714/738 |
| 2002/0168029 | A1 | 11/2002 | Onizuka et al. | 375/316 |
| 2006/0133468 | A1 * | 6/2006 | Chen et al. | 375/224 |
| 2006/0204113 | A1 * | 9/2006 | Wang et al. | 382/236 |

OTHER PUBLICATIONS

"Audio Analyzer R&S UPL, Option R&S UPL-B23 and Audio Switcher R&S UPZ" Version 02.00, Jan. 2004, Rohde & Schwarz GmbH.
"Product Information: Professional Test DVDs", Rohde & Schwarz GmbH.
"Audio Precision Product Bulletin: OPT-2711 Dolby Digital Generator", Audio Precision.
"Digital Audio Signal Generator DG-2530A", Kenwood TMI Product Data Sheet.

* cited by examiner

*Primary Examiner*—Victor Kostak
(74) *Attorney, Agent, or Firm*—Law Office of Karen Dana Oster, LLC

(57) ABSTRACT

Coded test signals in two or more distinct coding formats are applied sequentially to the equipment under test (EUT) according to a test sequence. The ordering, timing and source characteristics of the coded test signals are fully programmable. The output of the EUT is analyzed to verify proper decoding and detect audible artifacts. A means for comparing recorded test events allows a test engineer to detect failure modes of the autodetection system in the EUT.

9 Claims, 8 Drawing Sheets

METHOD AND APPARATUS FOR CODING FORMAT AUTODETECTION TESTING

BACKGROUND OF THE INVENTION

The present invention relates generally to the testing and measurement of digital media devices, and specifically to a method and apparatus for evaluating the performance of systems that autodetect the coding format of incoming data streams.

Digital-media devices are required to interpret data streams that may be delivered in various coding formats. Sources of coded audio and video data include satellite TV receivers, game consoles, CD and DVD players, personal computers, etc. In the case of coded digital audio, devices are typically designed to communicate interchangeably through an IEC 60958 interface. This interface was originally designed to carry stereo linear PCM data, however IEC 61937 specifies how multi-channel compressed audio formats (e.g. AC-3, DTS, etc.) may be transmitted on the IEC 60598 interface.

FIG. 1 illustrates a typical multi-source digital-audio receiver that performs autodetection of the coding format of incoming audio data. The coded signal sources 010*a*-010*d* provide audio data in several distinct coding formats. A source is connected via the input selector 015 to the IEC 60958 receiver 020. The IEC 60958 receiver 020 feeds the coded audio data to an autodetection system 030. The autodetection system 030 decides the coding format of the incoming data and makes a format selection 035. This instructs a decoder selector 040 to switch the incoming data stream to either a decoder bypass 051 in the case of linear PCM data, or in the case of compressed audio coding formats to the appropriate decoder 050*a*-050*d*. After the decoder section output 060 there may be other digital signal processing, mixing or amplification.

If an autodetection system as illustrated in the previous example fails to correctly (or quickly) determine the coding format of the incoming data, the decoder circuitry may fail to produce audio. Worse yet autodetection failure may create audible and obnoxious decoding artifacts in an attempt to decode data in the incorrect format. It is a goal when designing an autodetection system that coding formats will be quickly and accurately detected so that drop outs or audible artifacts in the decoded audio output are absolutely minimized.

Autodetection systems such as described above commonly identify the format of incoming data by detecting synchronization patterns in the data stream which are designed to be unlikely to appear in the actual program material, as well as other flags. There are a wide variety of methods for autodetection, and a general discussion of these is beyond the scope of this disclosure. U.S. Pat. No. 6,205,223 discloses systems and methods for autodetection.

Existing equipment developed for testing digital-audio decoders does not address the need for thorough and repeatable measurements for the evaluation of coding format autodetection systems. There are test systems commercially available which can produce coded test signals in order to perform standard audio measurements on devices which include decoder circuits (e.g. dynamic range, THD+N, etc.) These existing decoder testing systems are not equipped to test autodetection algorithms.

The German firm Rohde and Schwarz offers the Audio Analyzer UPL Option UPL-B23. It is capable of delivering coded test signals in several formats, but it uses test waveforms designed to avoid the creation of audible artifacts when switching between test signals. This is done in order to perform the standard audio measurements without disruption, but also demonstrates that the system is severely limited for testing the failure modes of autodetection algorithms.

Audio Precision manufactures the 2700 Series Audio Analyzers, and the OPT-2711 Dolby Digital Option allows real-time generation of AC-3 encoded test signals for test and measurement purposes. The OPT-2711 system also lacks the capabilities necessary for properly testing autodetection algorithms. Specifically it lacks the capability to assess the performance of autodetection systems under variance in signal timing and source characteristics, and their behavior when encountering a change of coding format.

There are commercially available DVDs which contain audio test signals in various coding formats. Rohde and Schwarz offers a set of Professional Test DVDs containing test signals in various coding formats. These types of products in combination with conventional digital-audio test equipment can provide a limited tool to address the requirements of testing autodetection algorithms. However using a pre-sequenced test disc is no substitute for a programmable autodetection testing system. While playing a test DVD there can be no variance of source-specific characteristics (e.g. signal level, jitter, etc.) that might be encountered in a realistic multi-source application.

U.S. Pat. No. 6,138,051 describes a system for testing audio decoders, in the form of encoded bitstreams which will produce an audible signal at the decoder output when the decoder fails. However that disclosure does not at all address the needs of testing autodetection algorithms.

The lack of test equipment designed for precise and repeatable evaluations of autodetection algorithms has led engineers in the field to come up with their own improvised solutions. A typical scenario involves the use of multiple CDs or DVDs, with program material encoded in various audio formats. The discs are interchanged in an appropriate player. The test engineer will manually select tracks and thereby choose between different combinations of test signals and coding formats. Using this homemade method an engineer may be able to detect certain design flaws in an autodetection algorithm, but the process is tedious and very imprecise.

There are substantial variations in the behavior of different audio sources when changing disc tracks. For example, when many DVD and CD players change tracks, the player's IEC 60958 output interface emits zero valued samples until new audio data is available. Other sources emit special code words called "pause bursts" as described in U.S. Pat. No. 6,076,062 between intervals of actual audio playback. Still other audio sources will completely silence their digital outputs, producing no digital signals at all.

There is significant variation in the behavior of coded audio sources even within each of these three groups. For sources which emit "digital black" between tracks, some will maintain the interface status bits and sample rate associated with the last track played while others will switch to a default sample rate and/or set of status bits. Also differences in output voltage and jitter levels between the IEC 60958 output interfaces of coded audio sources can lead to some receivers having difficulty locking onto the data stream. This type of failure can interfere with the timely passing of data to an autodetection algorithm.

There is no existing digital audio test system which can detect the effect of these functional differences on the performance of an autodetection system.

In summary the current art of autodetection algorithm testing is severely limited in the ability to reproduce the timing and variety of playback and source switching events. At best the improvised methods currently in use could be described as a stochastic test procedure, with the major drawbacks of operational tedium and a lack of flexibility, repeatability and precision. At worst engineers using this method of testing may completely miss operating conditions which could produce audio dropouts, audible artifacts or even "lock-up" of the autodetection algorithm(s) resulting from a transition between coding formats.

There are a few devices outside of the field of test and measurement which superficially include a few of the desired features of an autodetection testing system. U.S. Pat. No. 6,629,197 discloses a system which programmably emulates some operational characteristics of a CD changer, delivers the digital-audio contents of "virtual CD-ROMs" and responds to external control signals. A product built using the aforementioned invention merely achieves compatibility with existing home theater devices by emulating a user-selected changer. However the system disclosed therein fails to address the needs of test sequencing, synchronization, and signal analysis for an automated test application.

BRIEF SUMMARY OF THE INVENTION

Preferred embodiments of the present invention provide a flexible, repeatable and precise method and apparatus for the testing of coding format autodetection systems. The method of the present invention records the occurrence of generation events (e.g. start of a new coded test signal) and of analysis events (e.g. detection of an audible artifact or properly decoded signal). The apparatus of the present invention provides a synchronized and programmable means for executing the testing method as well as a display which allows the test results to clearly interpreted. An engineer using the method and apparatus of the present invention in the design of a coding format autodetection system has a valuable tool for the objective analysis of autodetection performance.

The foregoing and other objectives, features, and advantages of the invention will be more readily understood upon consideration of the following detailed description of the invention, taken in conjunction with the accompanying drawings.

DETAILED DESCRIPTION OF THE INVENTION

This disclosure sets forth a method and apparatus designed to address the needs of a thorough and precise evaluation of coding format autodetection equipment. Several embodiments of the subsystems are described but the scope of the invention is not limited to the embodiments which are explicitly discussed below. The testing method described herein is uniquely enabled by the novel combination of known elements comprising the apparatus.

The capabilities of the present invention to repeatably and arbitrarily switch coding format and to emulate other characteristics of "real-world" sources are crucial to the thorough testing of an autodetection algorithm. There is a lack of prior art testing methods that adequately address the problems encountered during the testing of an autodetection algorithm.

The subsystems of preferred embodiments of the present invention communicate by messages and events that are labeled in upper case (e.g. GENERATOR_PARAMETERS, DECODED_SIGNAL, etc.) The exact format and protocol employed for communication is unimportant to the correct function of the method and apparatus of this disclosure. In addition it may possible to devise equivalent embodiments which group and label differently the information and functions represented by the subsystems, messages and events described herein. The specific names and grouping of subsystems, messages and events disclosed herein were chosen for clarity and completeness in describing the function of the present invention, and should not be construed to exclude equivalents thereof.

Figure 1:
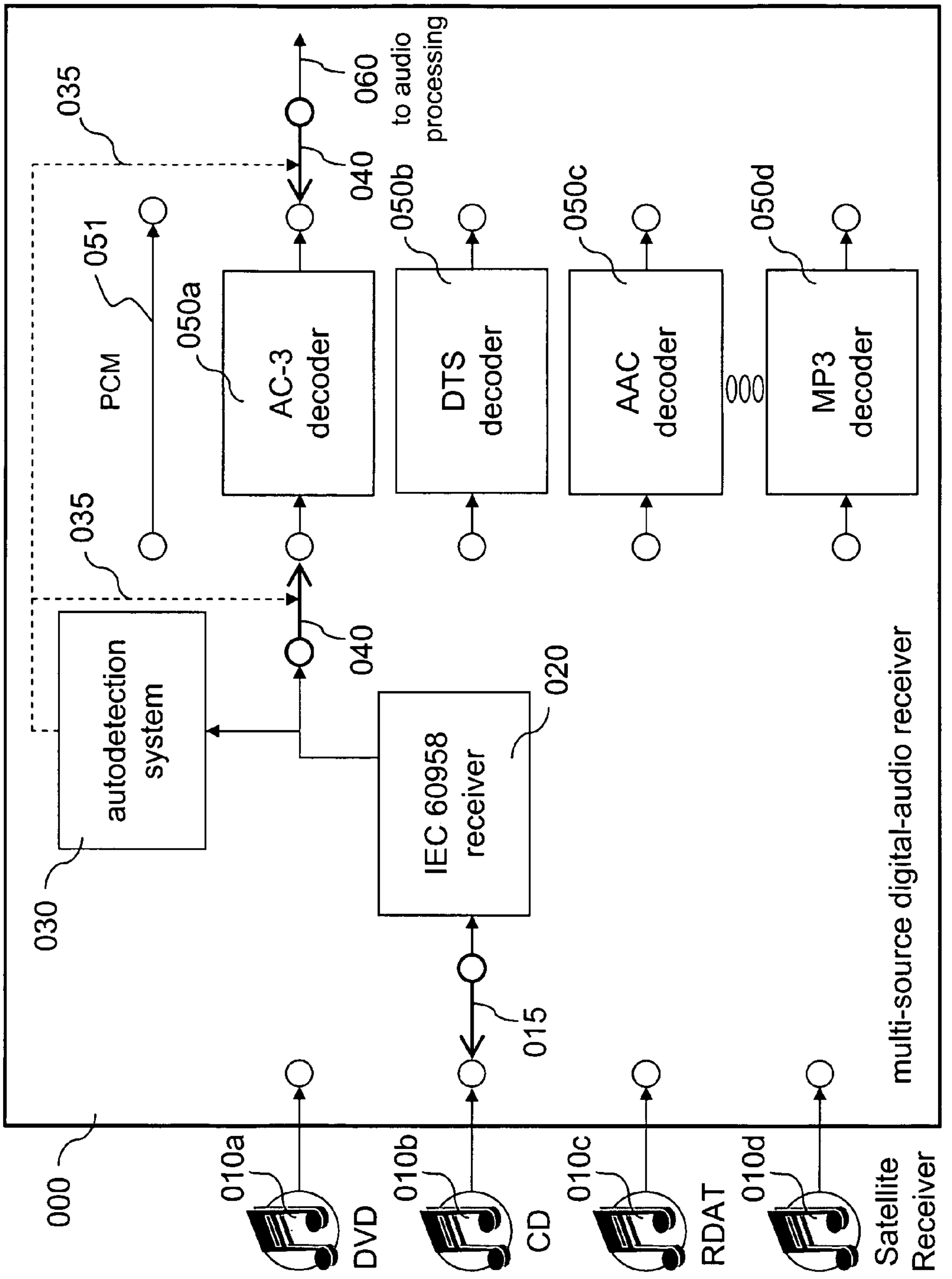
FIG. 1 is a schematic of a multi-source digital audio receiver illustrating a typical application of a coding format autodetection system.
Figure 2:
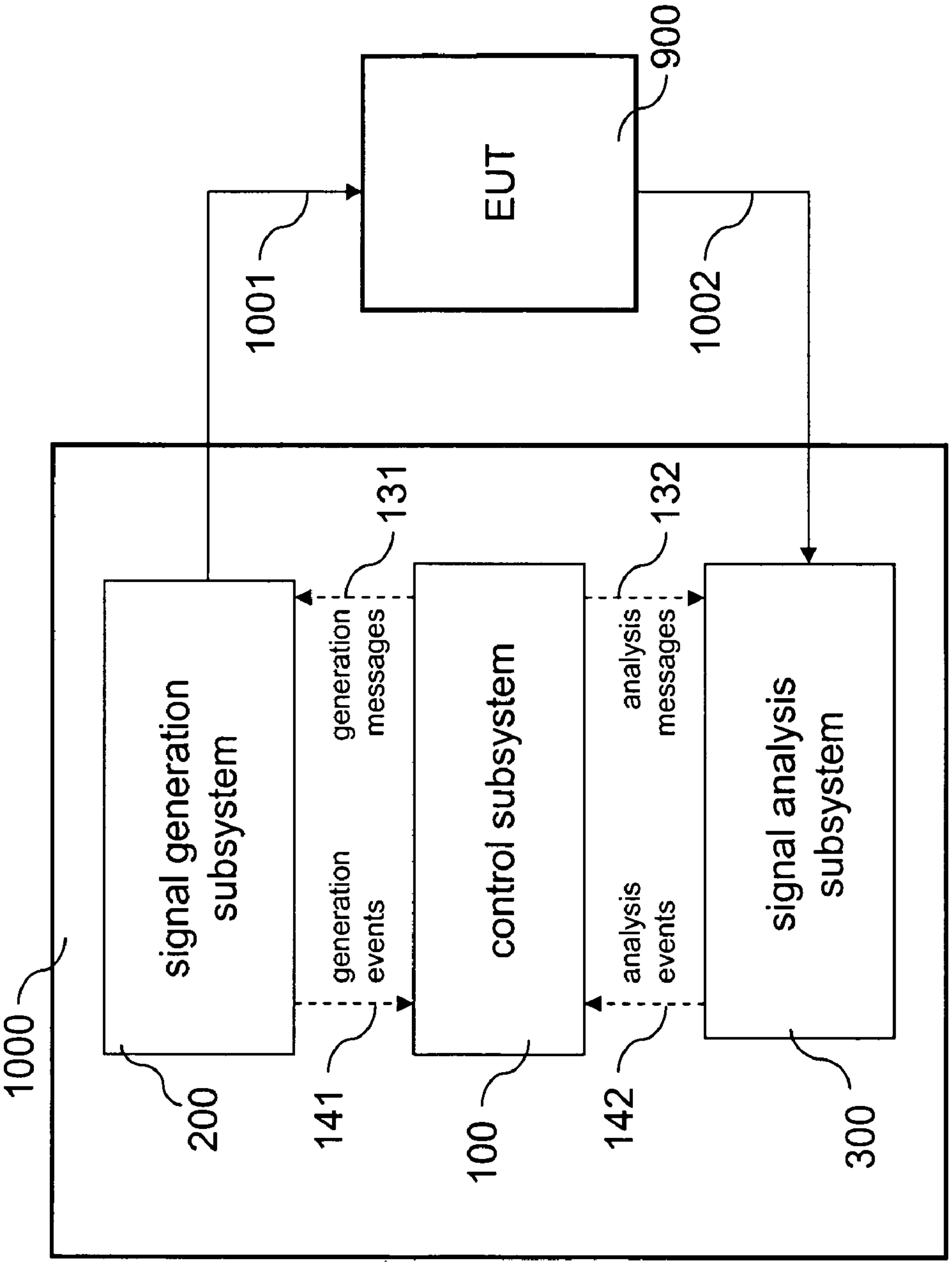
FIG. 2 is a system overview of a preferred embodiment of the present invention including major subsystems, signal flow, messages, and events

FIG. 2 is a system overview of a preferred embodiment autodetection testing system 1000 according to the apparatus of present invention. Signal flow (solid arrows) between the various subsystems is shown as well as the communication (dashed arrows) of control messages and test events.

A control subsystem 100 provides control and automation of the other subsystems, as well functionality for test sequencing and recording of results. A signal generation subsystem 200 delivers stimulus signal(s) 1001 to the equipment under test (hereafter called EUT 900). A signal analysis subsystem 300 handles the acquisition of response signal(s) 1002 from the EUT 900, and performs data processing steps necessary for the detection of audible artifacts, decoded signals, etc.

In the preferred embodiment 1000 the control subsystem 100 is comprised of one or more computer programs executable in a PC. The control subsystem 100 directs the operation of signal generation subsystem 200 via generation messages 131 and the signal analysis subsystem 300 via analysis messages 132. Reported generation events 141 and analysis events 142 are recorded by the control subsystem 100 for later comparison.

In the preferred embodiment 1000 the signal generation subsystem 200 and the signal analysis subsystem 300 may be implemented with modular hardware cards in a PC including any necessary signal generators, encoders, DSP hardware, connectors etc. These basic elements required to implement the subsystems of the apparatus of present invention are known to those skilled in the art of digital-audio test and measurement devices. There are also existing programmable hardware/software frameworks which are well suited to implementing the control subsystem 100. A good example is the National Instruments Labview system. Labview includes the basic timing, command, display and data storage facilities required to implement the control subsystem 100. Labview also includes a standardized API that makes it straightforward to integrate third-party hardware devices into its measurement framework.

Figure 3:
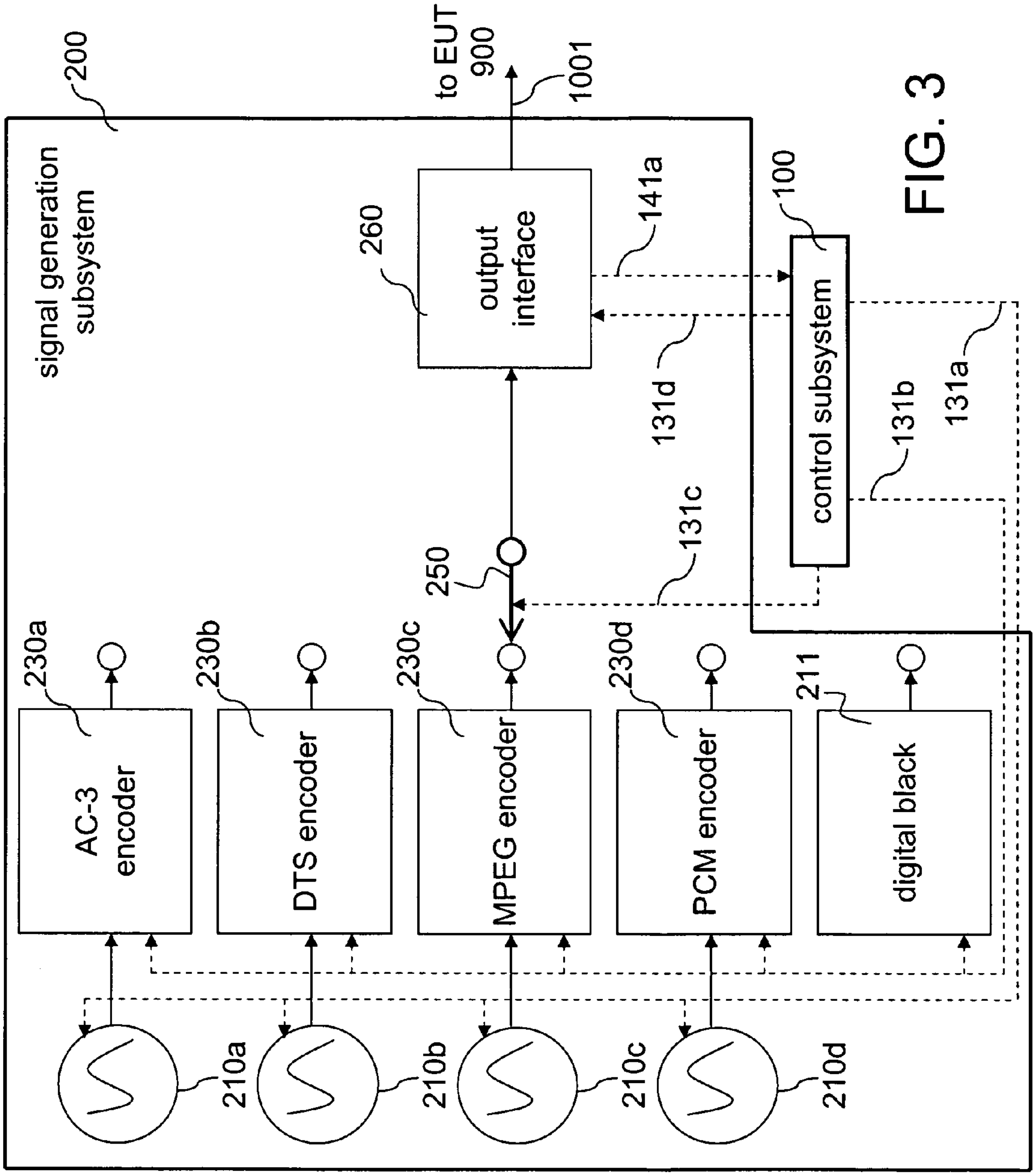
FIG. 3 is a block diagram showing a preferred embodiment of the signal generation subsystem

FIG. 3 is a block diagram illustrating a preferred embodiment of the signal generation subsystem 200.

The control subsystem 100 sends a GENERATOR_PARAMETERS 131*a* message to specify the digital waveforms to be produced by the test signal generators 210*a*-210*d* which respectively provide input to a set of encoders 230*a*-230*d*. Encoder-specific parameters, which in various embodiments may include date rate and number of channels, are sent by the control subsystem 100 with an ENCODER_PARAMETERS 131*b* message.

An output signal selector 250 selects the output of an encoder under direction of the control subsystem 100 via an OUTPUT_SELECT 131*c* message. The output signal selector 250 also allows the selection of a digital black generator 211 which produces zero-valued samples. Alternate embodiments could include a pause burst generator in order to produce a wider range of possible source behaviors. The output signal selector 250 is connected to an output interface 260 which properly formats and transmits the stimulus signal 1001 to the equipment under test 900.

The control subsystem in the preferred embodiment controls the output interface 260 by sending a OUTPUT_INTERFACE_PARAMETERS 131*d* message. Controllable parameters in the output interface 260 may include sample rate, output amplitude, jitter, and other source-specific characteristics. In an embodiment of the apparatus intended to deliver coded audio on the IEC 60958 interface, the output interface 260 must include the addition of synchronization words and zero padding to prepare the selected coded test signal to comply with IEC 61937. Injection of errors in the timing or content of these synchronization words would provide another useful layer of source realism to an output interface. Alternate embodiments of the signal generation subsystem could include a separate output interface for every encoder, with each output interface having different non-ideal source characteristics.

The inclusion of multiple independent test signal generators 210*a*-210*d* allows a multitude of test signals with different frequency, phase, etc. to exist simultaneously. If each encoder 230*a*-230*d* is fed with a sinusoidal test signal of a distinct frequency, then after switching to a new coded test signal (and a new coding format) it is easier for the signal analysis subsystem 300 to determine when the EUT 900 has stopped decoding the prior detected coding format.

The encoders 230*a*-230*d* may be implemented in either hardware or software. There are encoders of both types available for all of the major coded digital audio formats. A software-encoder implementation would usually be preferred when the system is implemented entirely on a personal computer, whereas a hardware-encoder implementation may be preferred if test system hardware is required to be physically separate from a controlling computer.

If the encoders 230*a*-230*d* are implemented in software some of the engineering tradeoffs inherent to a hardware-encoder implementation are resolved, since a subroutine which implements the test signal generator may be called multiple times to create test signals for each of the encoders. Therefore a software implementation can practically implement a large number of independent encoders, which could be prohibitively expensive if hardware encoders were used instead. When implemented in software the encoders 230*a*-230*d* may be called in such a way that they only run when their outputs are required.

Because in a PC-based embodiment there may be system delays after the issuance of a generation message 131 by the control subsystem 100, the preferred embodiment of the output interface 260 returns notification of the successful delivery of the selected coded test signal 241 to the control subsystem 100 as a generation event TEST_SIGNAL_DELIVERED 141*a*.

Figure 4:
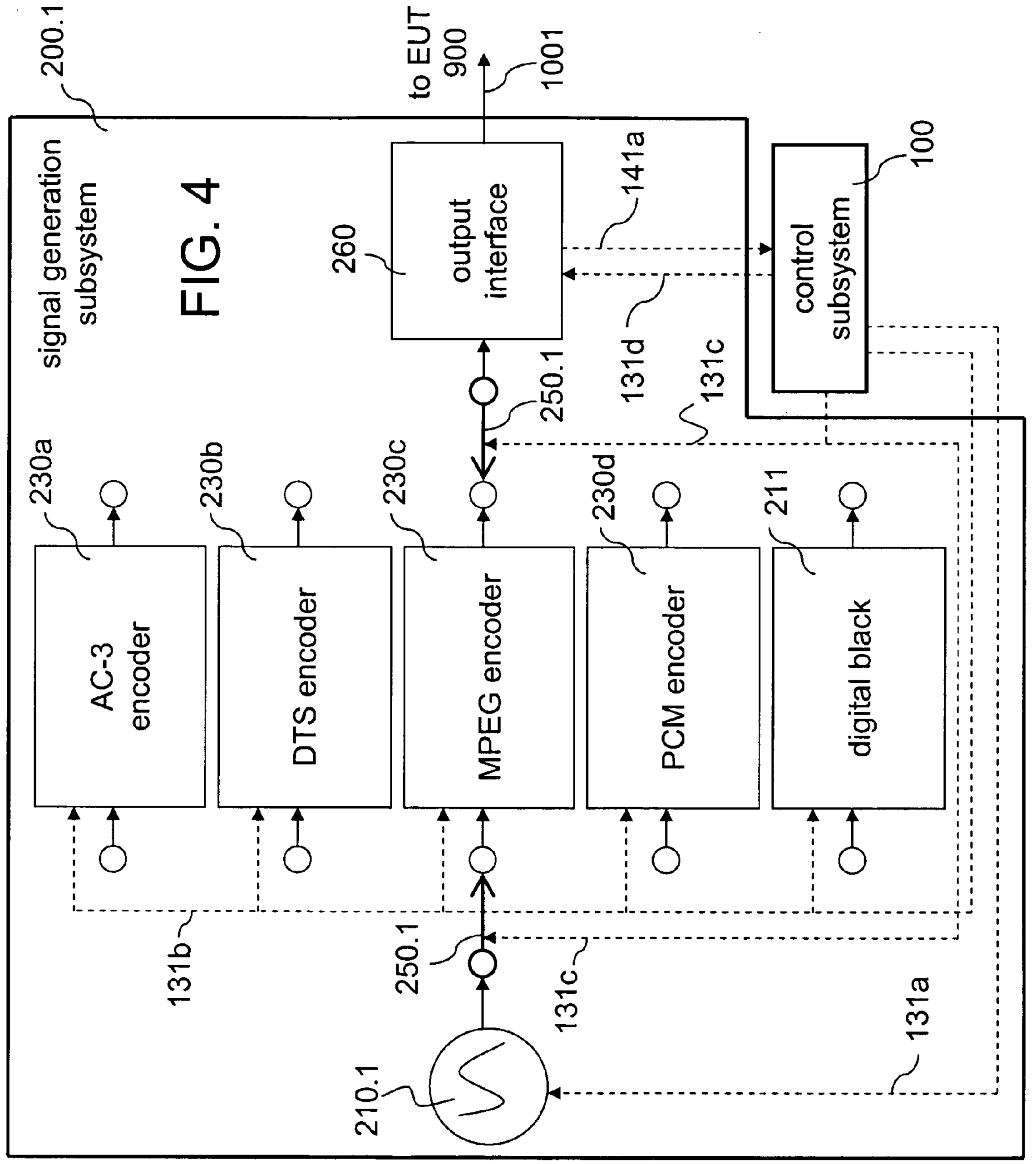
FIG. 4 is a block diagram showing a preferred single-generator embodiment of the signal generation subsystem

FIG. 4 depicts another preferred embodiment 200.1 of the signal generation subsystem that includes only one test signal generator 210.1 that when switched by the output signal selector 250.1 provides a common input source for the encoders 230*a*-230*d*. However the simplicity and reduced cost of a design with a single test signal generator 210.1 compromises the flexibility of coded signal generation.

The behavior of a test system that employs several test signal generators is distinct from a test system which simply alters the waveform parameters of a single test signal generator 210.1 when switching between encoders 230*a*-230*d* with a GENERATOR_PARAMETERS 131*a* message. Because the encoders 230*a*-230*d* have system memory the coded output will vary based on the past history of input. In other words, the bitstream output of an encoder will differ if it has been encoding a particular test signal continuously for some time, or if the encoder has just begun receiving the test signal.

Figure 5:
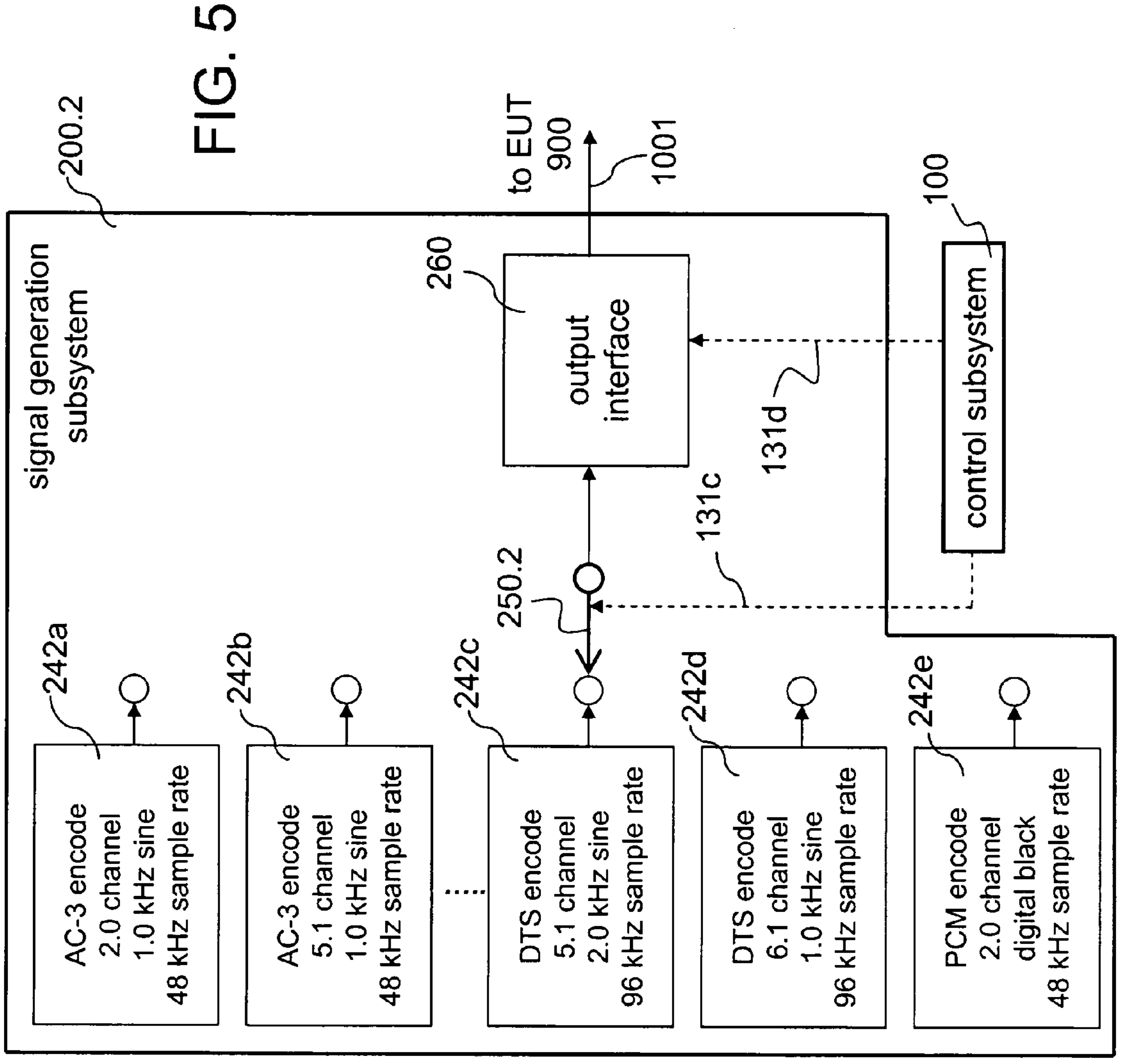
FIG. 5 is a block diagram showing a preferred pre-encoded waveform embodiment of the signal generation subsystem

FIG. 5 illustrates an embodiment 200.2 of the signal generation subsystem which employs pre-encoded test signals 242*a*-242*e*. Instead of using one or more signal generators followed by two or more encoders, the control subsystem instructs the signal generation subsystem 200.2 to send one of a plurality of pre-encoded test signals 242*a*-242*e* via the output signal selector 250.2 to the output interface 260 for deliver to the EUT 900.

An encoder-based embodiment, whether the encoders are implemented in hardware or software, requires the licensing of rights for each proprietary coding format (e.g. AC-3, DTS, MPEG, etc.) The pre-encoded waveform embodiment largely eliminates the need for licensing such technologies, since the respective patents generally apply to the use of encoding algorithms or apparatus, and not to the reproduction of pre-encoded bitstreams.

There is necessarily a compromise in the flexibility of tests that may be performed with a pre-encoded test signal embodiment. The available test signal frequencies, amplitudes, sample rates and coding formats are limited to the range of the test signals that have been pre-encoded. If testing applications require additional combinations they must be created and stored in advance of testing. Any continuously variable generation parameters such as signal amplitude must be quantized to a relatively small number of values, because an embodiment using pre-encoded test signals will have finite data storage capacity, and the size of a complete set of pre-encoded test signals is the cumulative product of the number of values made available for each generation parameter.

An exemplary embodiment with a limited range of pre-encoded test signals could include sinusoidal test signals with frequencies of 100 Hz, 1 kHz and 10 kHz. These test signals could be pre-encoded at two amplitudes (0 dBFS and −120 dBFS) at the common sample rates of 44.1 kHz, 48 kHz and 96 kHz, into MPEG, DTS and AC-3 coding formats, as well as linear PCM. Complete coverage of this set of parameters requires 72 pre-encoded test signals. If the test signals were encoded for both 2 channel (stereo) and 5.1 channel (surround) coding formats then 144 distinct pre-encoded test signals would be required.

Figure 6:
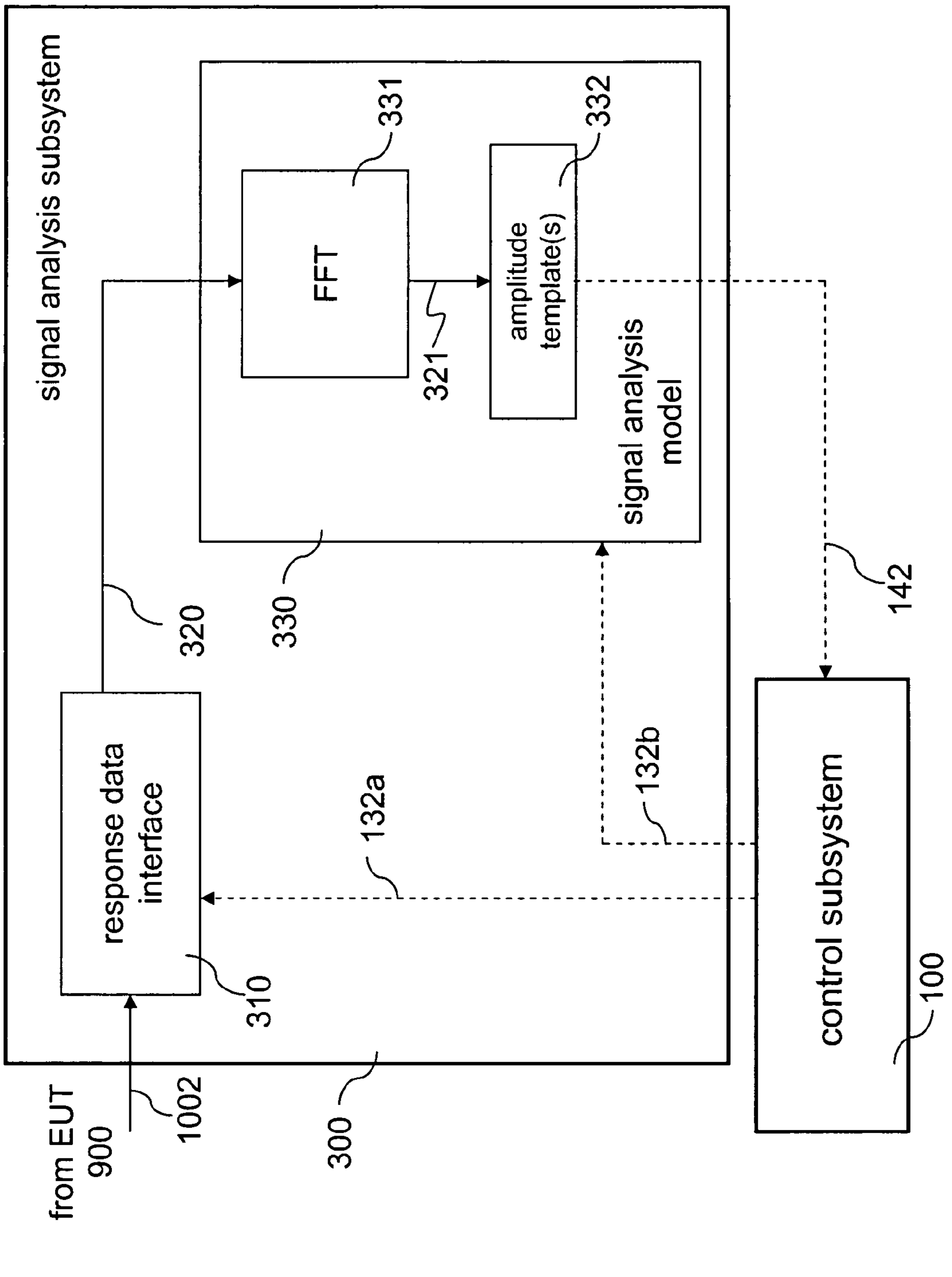
FIG. 6 is a block diagram showing a preferred embodiment of the signal analysis subsystem

FIG. 6 is an illustration of the preferred embodiment of the signal analysis subsystem 300. The control subsystem issues analysis messages 132*a*-132*b* to the signal analysis subsystem 300. Response signals 1002 taken from the output of the EUT 900 are delivered to the response data interface 310 producing response data 320 which is provided to a signal analysis model 330. The signal analysis model 330 detects significant changes in the measurement state of the response data 320, which are reported to the control subsystem 100 as analysis events 142.

It is important to note that in this embodiment 300 of the signal analysis subsystem, analysis events 142*a*-142*b* are reported to the control subsystem 300 when changes in measurement state are detected, but it would be an acceptable scheme to continuously record the measurement state at sufficiently small regular time intervals. In this preferred embodiment signal analysis subsystem 300, changes in measurement state are recorded as analysis events, instead of continuously recording the measurement state through the entire test because the data throughput requirements in a practical implementation are lower. This is due to the redundancy of information that would exist in a continuously recorded measurement state that is sampled at a much faster rate than the test stimulus is changing.

The analysis messages 132*a*-132*b* can modify parameters of the response data interface 310 and of the signal analysis model 330. RESPONSE_DATA_INTERFACE_PARAMETERS 132*a* includes the expected sample rate of the response signal 1002. ANALYSIS_PARAMETERS 132*b* includes instructions on what threshold levels to use in detecting audible artifacts, and what spectral energy distribution to expect from a properly decoded test signal. Some of the decision-making logic of the signal analysis subsystem could be incorporated in the programs(s) which comprise the control subsystem 100, making the functional partition between the subsystems at times arbitrary. For clarity in this disclosure the signal analysis model 330 and associated logic are wholly included in the signal analysis subsystem 300.

In the preferred embodiment the response data 320 is input to a Fast Fourier Transform (FFT 331). The FFT 331 provides a convenient means for transforming the response data 320 from the time domain to the frequency domain. In the preferred embodiment 1000, analysis of the response data 320 is performed by functions on the transformed response data 321.

Analysis of the response data 320 is implemented in the preferred embodiment signal analysis subsystem 300 by amplitude templates 332 which compare a weighted sum of the amplitudes in the frequency bins of the transformed response data 321 to one or more threshold values. The amplitude templates 332 may be dependent on the known amplitude or spectral content of the selected coded test signal 241, or on other user-specified parameters such as the desired artifact tolerance for the EUT 900. The inventor has previously disclosed a test system using such amplitude templates in U.S. Pat. No. 5,749,047.

Psychoacoustic research has produced models of frequency masking which, when given the amplitude and frequency of a "desirable" signal, will predict the levels of tones at other nearby frequencies that will become audible to the average listener. These models are commonly employed to create highly efficient audio coding schemes. According to these models, a low level tone that is close in frequency content to a dominant tone or signal will be less easily perceived than a tone which is more distant in the frequency spectrum.

Amplitude templates based on models of frequency masking may be used to detect the audibility of artifacts produced by decoder circuitry. In such an implementation, if the amplitude of certain frequency bins rise into the range considered "audible" by the frequency masking model, the control subsystem 100 is notified of an AUDIBLE_ARTIFACT 142*c* event. When the transformed response data 321 exceeds a template for the expected decoded signal the control subsystem 100 is notified of a DECODED_SIGNAL 142*b*.

There may be different amplitude templates required for the periods when there is no decoded signal present, since no dominant signal is present to mask decoder artifacts. Alternatively, a single template can be constructed in such a way that thresholds are dependent on the amplitude of the selected coded test signal 241. Detected analysis events such as DECODED_SIGNAL 142*b* and AUDIBLE_ARTIFACT 142*c* may be recorded with additional information including the time of occurrence, duration, or an event parameter such the level of a detected artifact or decoded signal. For example the level of an audible artifact may be recorded as an event parameter subject to a defined threshold level, therefore not all analysis events may be recorded with event parameters.

There exist functionally similar schemes for detecting the presence of a correctly decoded signal or audible artifacts. Some of these involve time-domain filters tuned to select or reject the band(s) of interest (as appropriate to the type of test being performed) followed by level measurement for the detection of a threshold signal value. This approach is less amenable to a graphical display of results in the frequency domain. Time-domain filters may however be able to determine more precisely when the EUT output changes since they do not require processing of data in blocks as an FFT does, and they will produce output at every sample interval. A time-domain filter embodiment of the signal analysis subsystem could in some cases be more computationally efficient than the embodiment described in this disclosure, especially when high frequency selectivity and good time resolution are both required for the test application. Alternate embodiments of the signal analysis model 330 may be constructed using such time-domain filtering techniques.

Figure 7:
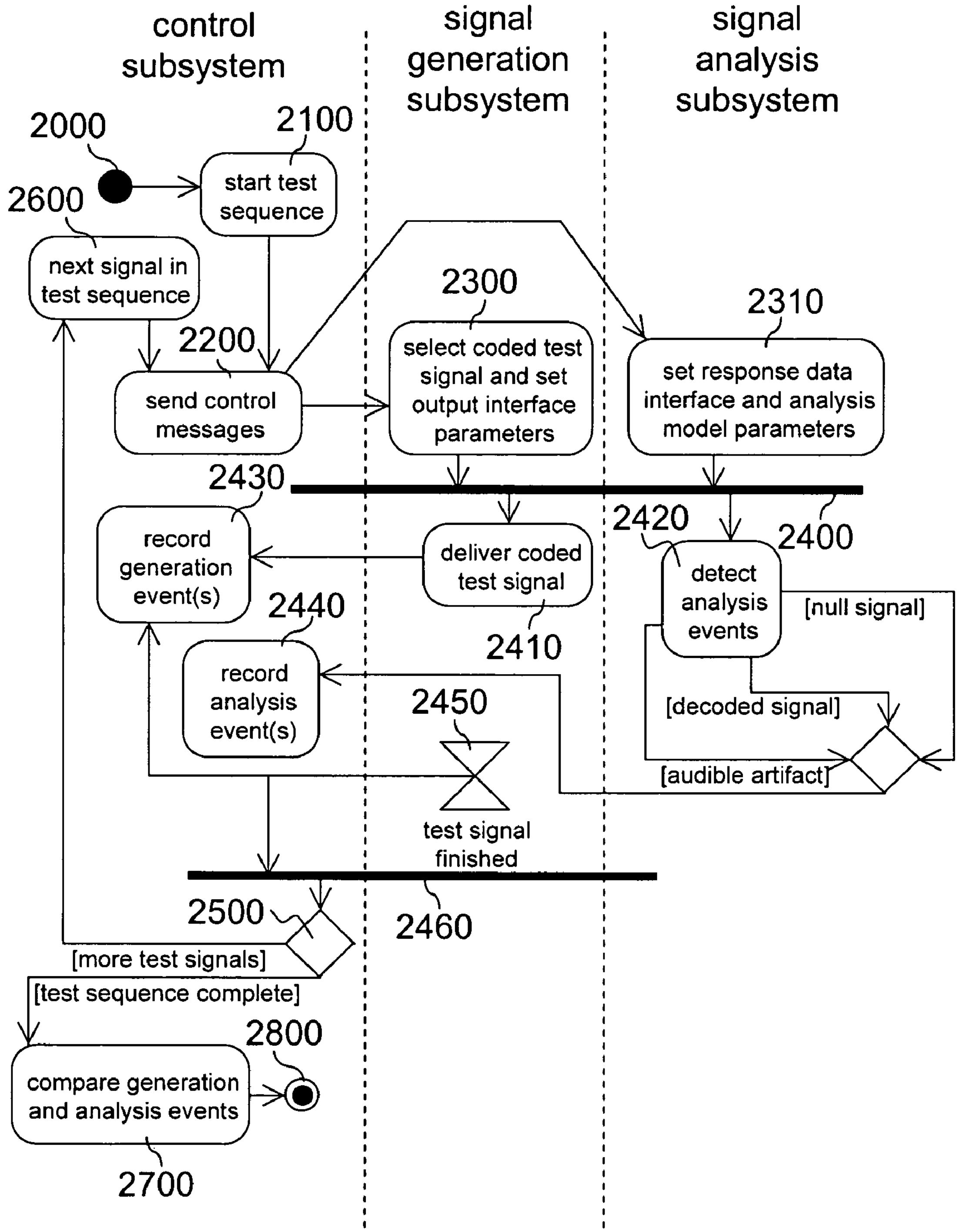
FIG. 7 is an activity diagram showing a preferred method embodiment as implemented by the various subsystems of a preferred apparatus embodiment of the present invention.

FIG. 7 is an activity diagram which illustrates the claimed testing method. Vertical dashed lines define the subsystem localization of a particular step performed in the method. Steps of the method which are located between thick horizontal bars may occur asynchronously or in parallel. Not depicted are steps for test programming because there are suitable programming interfaces well-known in the art, and the specifics of the programming interface are unimportant to the function of this testing method.

The test method 2000 begins in the control subsystem with start test sequence 2100. Start test sequence 2100 includes loading information about the first test signal to be delivered, and the parameters to be sent to the generation and analysis subsystems. The next step is in the control subsystem to set generation and analysis parameters 2200 by sending appropriate generation and analysis messages to the other subsystems.

Next the signal generation subsystem will select a coded test signal and set the output interface parameters 2300. Output interface parameters may include desired sample rate and source emulation characteristics such as signal level and jitter. The signal analysis subsystem will then set response data interface and analysis model parameters 2310. Such parameters include information about the selected coded test signal that will be used to in the analysis of response data.

An asynchronous fork 2400 indicates that following activities may occur in parallel. The signal generation subsystem delivers 2410 the coded test signal to the EUT and the control subsystem records 2430 the delivery as a generation event. The signal analysis subsystem uses its analysis model(s) to detect 2420 changes in the response data received from the EUT. Such changes are recorded 2440 by the control subsystem as analysis events. When the current coded test signal is finished 2450 the control subsystem records 2430 it as a generation event. At this point the control subsystem checks 2500 if there are more test signals in the sequence, and loads 2600 the parameters of the next signal if the test sequence is not finished. Comparison 2700 of recorded generation and analysis events allows the user to determine if the autodetection system in the EUT has failed. This concludes 2800 a single iteration of the testing method. More test sequences may be necessary to precisely target suspected failure modes.

The step of comparison 2700 of recorded generation and analysis events deserves some special attention and explanation. The performance of an autodetection system in response to the method 2000 cannot simply be characterized as “pass” or “fail.” The testing method 2000 provides a precise and repeatable means of testing, but the end result requires some interpretation by the test engineer.

Figure 8:
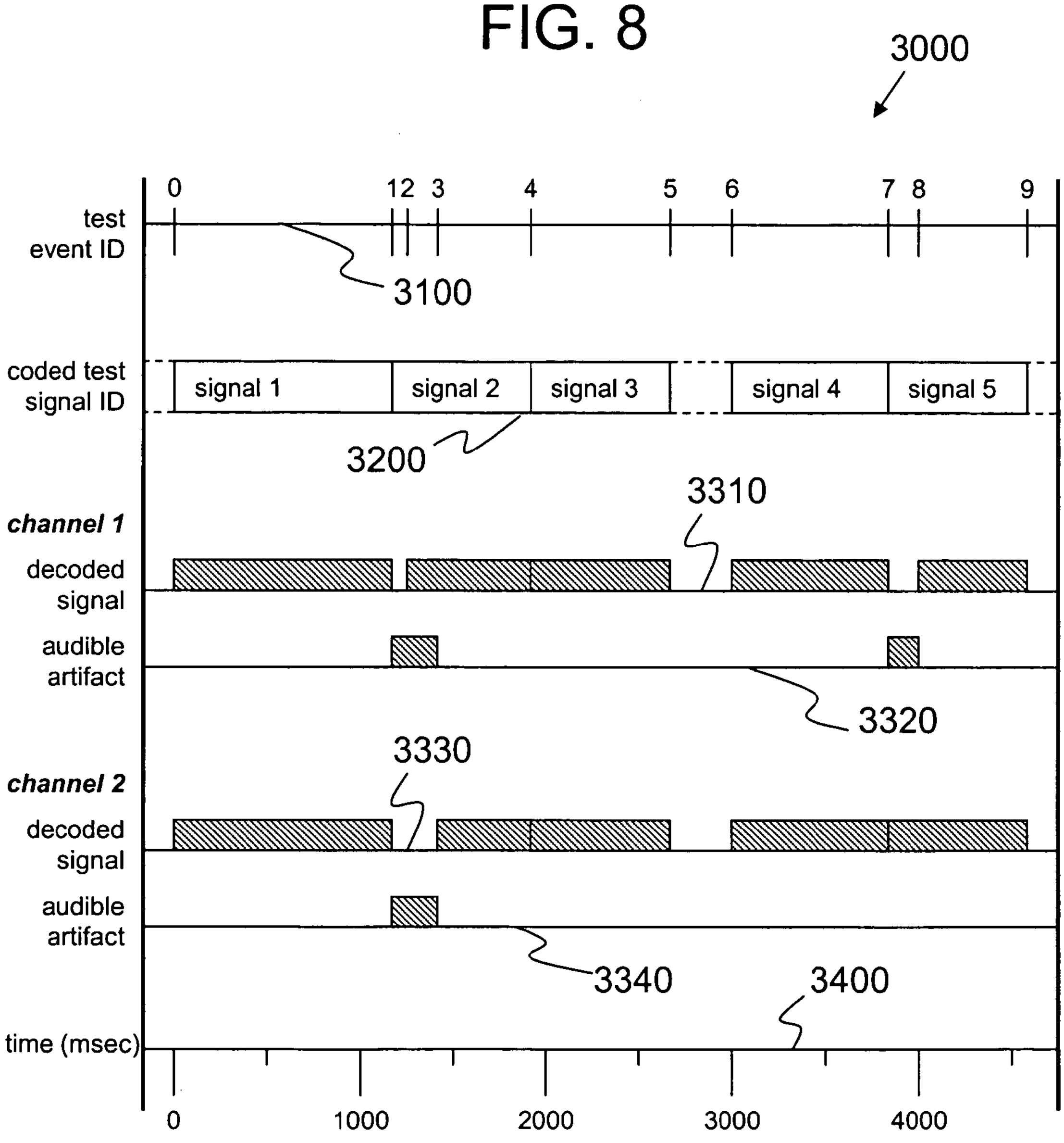
FIG. 8 is a preferred embodiment event timing display showing the occurrence of generation and analysis events during a test on a common time scale.

FIG. 8 is a preferred embodiment event timing display 3000 showing the occurrence of generation and analysis events on a common time scale. The event timing display 3000 provides a means for comparison of recorded test events. The occurrence of test events during a test is indicated by the test event ID display 3100. The arrangement and duration of coded test signals is shown by the coded test signal ID display 3200. The event timing display 3000 shown here shows the results of a 2-channel decoding process, but the display concept can be easily extended to other channel configurations (e.g. mono, 5.1 surround, etc.)

Analysis events are shown on the event timing display 3000 by graphs including channel 1 decoded signal 3310, channel 1 audible artifact 3320, channel 2 decoded signal 3330 and channel 2 audible artifact 3340. These graphs provide a test engineer with valuable information about the possible causes of failure to autodetect, or the occurrence of audible artifacts in the decoded output. The test engineer will be able to correlate shown analysis events and generation events, which are shown by the coded test signal ID display 3200, in order to track down potential problems with the autodetection algorithms in the equipment under test. The time axis 3400 gives an indication of the absolute time of occurrence of all test events, relative to the beginning of the test.

The present invention can be employed in testing either audio or video autodetection implementations. In the case of audio it is applicable to any digital interface which can carry multiple formats of encoded data to a receiving unit. This includes (but is not limited to) the IEC 60958, IEEE 1394 and USB digital interfaces. The general system and method would remain the same with an output interface and a response data interface appropriate to the chosen application.

The present invention may be used in the testing of hardware-based or software-based autodetection algorithms. The use of the terms “coding format autodetection equipment” in the claims that follow should be construed to include hardware devices and/or software programs which implement algorithms for coding format autodetection.

The individual functional elements of the present invention are well-known in the art of digital-audio test devices. The novelty and usefulness of the invention are chiefly embodied in the capabilities of the testing method, which is enabled by a novel cooperating combination of the conventional elements in the preferred apparatus embodiments presented.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A method for testing coding format autodetection equipment comprising the steps of:

a) delivering two or more coded test signals sequentially to the equipment under test, where the coded test signals have been encoded in two or more distinct coding formats, wherein the delivery of each coded test signal constitutes a generation event;

b) recording each generation event;

c) receiving response data from the equipment under test;

d) detecting the occurrence of analysis events by applying one or more signal analysis model(s) to the received response data;

e) recording each detected analysis event; and f) recording an identifier and a time of occurrence for each generation event and for each detected analysis event.

2. The method of claim 1 further comprising the step of recording an identifier and an event parameter for one or more detected analysis events.

3. An apparatus for testing coding format autodetection equipment comprising:

a) a signal generation subsystem, a signal analysis subsystem, and a control subsystem;

b) said signal generation subsystem comprising an encoded test signal generation means and an output interface, said encoded test signal generation means being directable by said control subsystem to generate encoded test signals and providing said encoded test signals to said output interface, said output interface delivering said encoded test signals to the equipment under test;

c) said signal analysis subsystem comprising a response data interface and a signal analysis model, said response data interface receiving response data from the equipment under test and providing said response data to said signal analysis model, said signal analysis model detecting the occurrence of analysis events;

d) said control subsystem comprising a test sequence, a control messaging means, a test event recording means, said control messaging means directing said signal generation subsystem to deliver said encoded test signals to the equipment under test according to said test sequence, and said test event recording means recording one or more of said detected analysis events; and e) the generation of each of said encoded test signals constituting a generation event and said test event recording means recording said generation events.

4. A method for testing coding format autodetection equipment comprising the steps of:

a) delivering two or more coded test signals sequentially to the equipment under test, where the coded test signals have been encoded in two or more distinct coding formats, wherein the delivery of each coded test signal constitutes a generation event;

b) recording each generation event;

c) receiving response data from the equipment under test;

d) detecting the occurrence of analysis events by applying one or more signal analysis model(s) to the received response data;

e) recording each detected analysis event; and f) recording the duration of each generation event and of each detected analysis event.

5. The method of claim 4 further comprising the step of recording an identifier and an event parameter for one or more detected analysis events.

6. A method for testing coding format autodetection equipment comprising the steps of:

a) delivering two or more coded test signals sequentially to the equipment under test, where the coded test signals have been encoded in two or more distinct coding formats, wherein the delivery of each coded test signal constitutes a generation event;

b) recording each generation event;

c) receiving response data from the equipment under test;

d) detecting the occurrence of analysis events by applying one or more signal analysis model(s) to the received response data;

e) recording each detected analysis event; and f) comparing recorded generation events and analysis events to assess the autodetection performance of the equipment under test.

7. The method of claim 6 further comprising the step of recording an identifier and an event parameter for one or more detected analysis events.

8. An apparatus for testing coding format autodetection equipment comprising:

a) a signal generation subsystem, a signal analysis subsystem, and a control subsystem;

b) said signal generation subsystem comprising an encoded test signal generation means and an output interface, said encoded test signal generation means being directable by said control subsystem to generate encoded test signals and providing said encoded test signals to said output interface, said output interface delivering said encoded test signals to the equipment under test;

c) said signal analysis subsystem comprising a response data interface and a signal analysis model, said response data interface receiving response data from the equipment under test and providing said response data to said signal analysis model, said signal analysis model detecting the occurrence of analysis events;

d) said control subsystem comprising a test sequence, a control messaging means, a test event recording means, said control messaging means directing said signal generation subsystem to deliver said encoded test signals to the equipment under test according to said test sequence, and said test event recording means recording one or more of said detected analysis events; and e) said test event recording means recording an identifier and a time of occurrence for each of said reported generation events and one or more of said detected analysis events.

9. An apparatus for testing coding format autodetection equipment comprising:

a) a signal generation subsystem, a signal analysis subsystem, and a control subsystem;

b) said signal generation subsystem comprising an encoded test signal generation means and an output interface, said encoded test signal generation means being directable by said control subsystem to generate encoded test signals and providing said encoded test signals to said output interface, said output interface delivering said encoded test signals to the equipment under test;

c) said signal analysis subsystem comprising a response data interface and a signal analysis model, said response data interface receiving response data from the equipment under test and providing said response data to said signal analysis model, said signal analysis model detecting the occurrence of analysis events;

d) said control subsystem comprising a test sequence, a control messaging means, a test event recording means, said control messaging means directing said signal generation subsystem to deliver said encoded test signals to the equipment under test according to said test sequence, and said test event recording means recording one or more of said detected analysis events; and e) a recorded event comparison means, said recorded event comparison means allowing comparison of said generation events and said detected analysis events to assess the autodetection performance of the equipment under test.

* * * * *